(12) United States Patent
Carita et al.

(10) Patent No.: US 6,487,861 B1
(45) Date of Patent: Dec. 3, 2002

(54) COMBUSTOR FOR GAS TURBINE ENGINES WITH LOW AIR FLOW SWIRLERS

(75) Inventors: Robert Gregory Carita, Needham, MA (US); Irven Charles Ball, West Newbury, MA (US); Frank Anthony Lastrina, Andover, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/874,854

(22) Filed: Jun. 5, 2001

(51) Int. Cl.[7] .................................................. F02C 1/00
(52) U.S. Cl. ........................ 60/748; 60/39.37; 60/737; 60/805
(58) Field of Search ................. 60/39.37, 39.821, 60/269, 735, 737, 740, 747, 748, 752, 805

(56) References Cited

U.S. PATENT DOCUMENTS 3,589,127 A * 6/1971 Kenworthy ................. 60/39.37
3,630,024 A * 12/1971 Hopkins ....................... 60/742
4,584,834 A * 4/1986 Koshoffer et al. ............. 60/737
4,854,127 A * 8/1989 Vinson et al. ................. 60/742
5,117,637 A * 6/1992 Howell et al. ................ 60/748

* cited by examiner

Primary Examiner—Charles G. Freay
Assistant Examiner—John F Belena
(74) Attorney, Agent, or Firm—Rodney M. Young; Pierce Atwood, Attorneys

(57) ABSTRACT

A combustor for a gas turbine engine includes outer and inner liners defining a combustion chamber and an igniter mounted to the outer liner. A dome plate is disposed between the outer and inner liners and has a plurality of circumferentially spaced openings formed therein. A fuel-air mixer is disposed in each one of the openings; each fuel-air mixer includes a swirler mounted in the corresponding opening and a fuel nozzle received in the corresponding swirler. Two adjacent ones of the swirlers are low air flow swirlers in general circumferential alignment with the igniter and the rest of the swirlers are higher air flow swirlers. Each one of the fuel nozzles provides a similar amount of fuel so that the two fuel-air mixers having low air flow swirlers produce a local region of increased fuel-to-air ratio in the vicinity of the igniter.

15 Claims, 4 Drawing Sheets

COMBUSTOR FOR GAS TURBINE ENGINES WITH LOW AIR FLOW SWIRLERS

STATEMENT REGARDING FEDERALLY SPONSORED RESEARCH & DEVELOPMENT

The U.S. Government may have certain rights in this invention pursuant to contract number N00019-97-C-01 14 awarded by the Department of the Navy.

BACKGROUND OF THE INVENTION

This invention relates generally to gas turbine engines and more particularly to combustors used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In combustors used with aircraft engines, the fuel is typically supplied to the combustor through a plurality of fuel nozzles circumferentially spaced around the forward end of the combustor. Each fuel nozzle has a surrounding assembly, known as a swirler, through which the air is supplied. Each swirler includes a number of angled vanes that impart a swirling motion to the air so as to cause the air and fuel to be thoroughly mixed.

The fuel-air mixture is ignited by an igniter mounted in the outer liner of the combustor. Under some conditions, particularly during rapid deceleration of the engine, an insufficient fuel-to-air ratio can develop and cause an engine flameout (i.e., a temporary loss of ignition). One approach to avoiding engine flameouts involves providing one of the fuel nozzles with an enriched primary circuit fuel schedule and the remaining fuel nozzles with a normal fuel schedule. The enriched fuel nozzle creates a local region of increase fuel-to-air ratio to prevent combustor flameout during rapid engine decelerations or other instances of insufficient fuel-to-air ratio. However, this approach requires that each combustor have two different fuel nozzle designs, which incrementally increases the overall production cost of the combustor.

Another known approach is to provide a plurality of identical fuel nozzles used in conjunction with an equal number of swirlers, wherein one of the swirlers is a low air flow swirler. The low air flow swirler supplies less air than the other swirlers so that it mixes the same amount of fuel as the other higher flow swirlers, but with less air. The low air flow swirler thus creates a local region of increased fuel-to-air ratio. By aligning the low air flow swirler with the igniter, the combustor is able to more easily re-ignite in the event that the remaining swirlers are extinguished temporarily during periods of insufficient fuel-to-air ratio, such as might occur during rapid engine deceleration. Because swirlers are generally easier to manufacture than fuel nozzles, it is less expensive to have two swirler designs for a single combustor than it is to have two fuel nozzle designs. Another benefit of using swirler air flow reduction instead of fuel flow enrichment to achieve an enriched fuel region is enhanced hot section durability because of lower combustor peak temperature factor at altitude conditions. That is, because less air is available at high altitude, using an enriched fuel nozzle would produce an extreme hot streak that would adversely impact durability of the hot section structure. Using air flow reduction lessens this hot streak effect.

However, it has been found that combustors using a single low air flow swirler can still experience flameouts. Accordingly, it is desirable to have a combustor design that avoids the increased production costs and lower durability of an enriched fuel nozzle and has more robust flameout prevention.

BRIEF SUMMARY OF THE INVENTION

The above-mentioned need is met by the present invention, which provides a combustor having outer and inner liners defining a combustion chamber and an igniter mounted to the outer liner. A dome plate is disposed between the outer and inner liners and has a plurality of circumferentially spaced openings formed therein. A fuel-air mixer is disposed in each one of the openings; each fuel-air mixer includes a swirler mounted in the corresponding opening and a fuel nozzle received in the corresponding swirler. Two adjacent ones of the swirlers are low air flow swirlers in general circumferential alignment with the igniter and the rest of the swirlers are higher air flow swirlers. Each one of the fuel nozzles provides a similar amount of fuel so that the two fuel-air mixers having low air flow swirlers produce a local region-of increased fuel-to-air ratio in the vicinity of the igniter.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
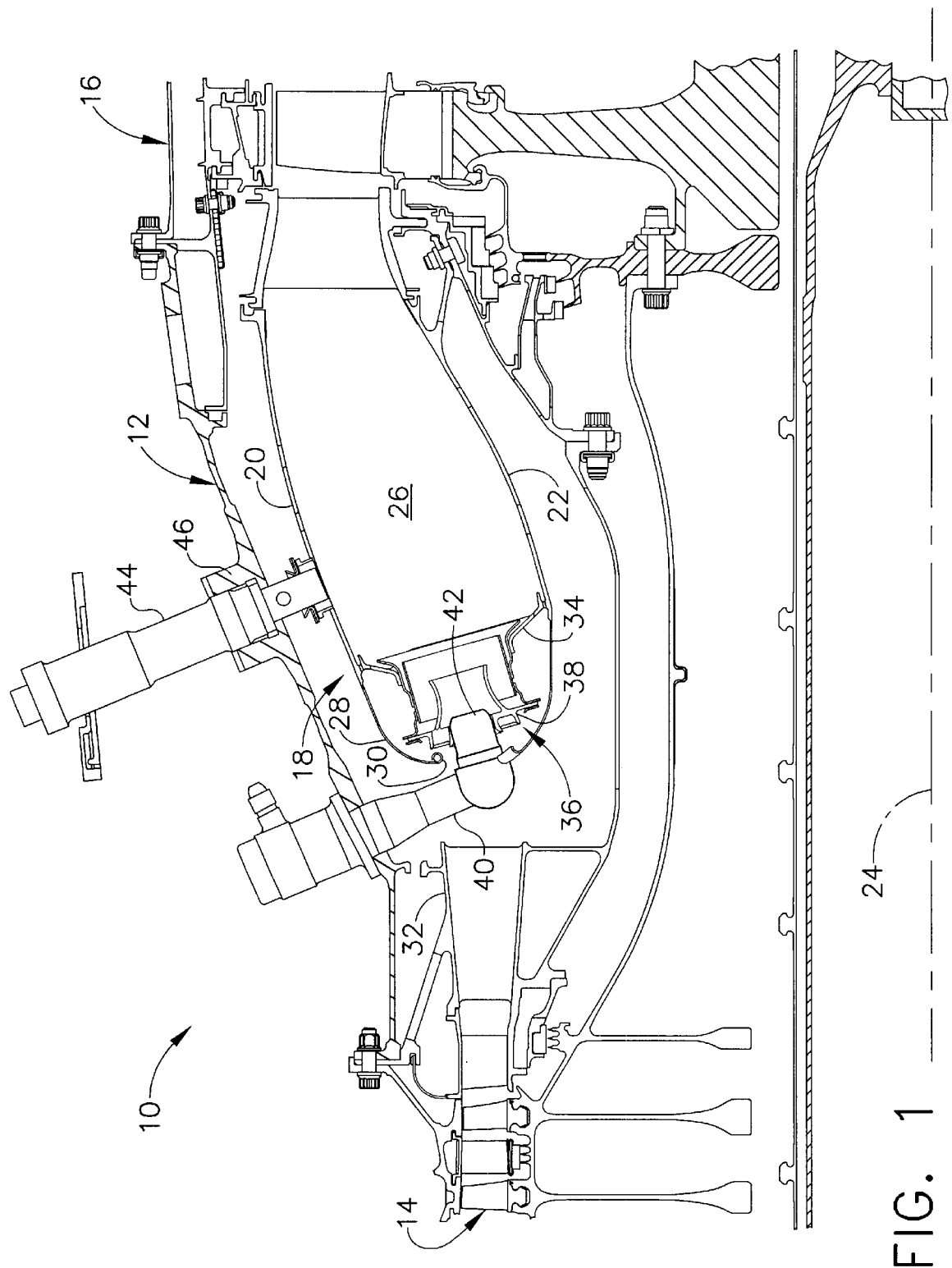
FIG. 1 is a longitudinal sectional view of a portion of a gas turbine engine, primarily showing the combustion section thereof.

Referring to the drawings wherein identical reference numerals denote the same elements throughout the various views, FIG. 1 shows a portion of a gas turbine engine 10 having a combustion section 12 that is located downstream from an axial flow compressor 14. The engine 10 includes a turbine section 16 that is located downstream from the combustion section 12.

The combustion section 12 includes a combustor 18 that includes an outer liner 20 and an inner liner 22. The outer and inner liners 20 and 22 are generally annular in form about an engine centerline axis 24 and are radially spaced from each other to define a combustion chamber 26 therebetween. A cowl assembly 28 is mounted to the upstream ends of the outer and inner liners 20 and 22. An annular opening 30 is formed in the cowl assembly 28 for the introduction of compressed air into the combustor 18. The compressed air is supplied from the compressor via a diffuser 32. Compressed air from the diffuser 32 passes principally through the opening 30 to support combustion and partially around the combustor 18 where it is used to cool the liners 20 and 22 and turbomachinery further downstream in the turbine section 16.

Disposed between and interconnecting the outer and inner liners 20 and 22 near their upstream ends is an annular dome plate 34. The dome plate 34 has a plurality of circumferentially spaced openings formed therein, and each opening has a fuel-air mixer 36 disposed therein for the delivery of fuel and air into the combustion chamber 26. Each fuel-air mixer 36 includes a swirler 38 mounted in the dome plate 34 and a corresponding fuel nozzle 40 having a fuel tip 42 received in a central opening of the swirler 38. In operation, the swirler 38 of each fuel-air mixer 36 imparts a swirling motion to compressed air received from the opening 30. The swirling air mixes with fuel injected from the corresponding fuel nozzle 40, and the resulting fuel-air mixture is discharged into the combustion chamber 26. The fuel-air mixture is ignited by an igniter 44 mounted in an igniter port 46 formed in the outer liner 20.

It is noted that although FIG. 1 illustrates a single annular combustor as an exemplary embodiment, the present invention is equally applicable to other types of combustors, such as double annular combustors.

Figure 2:
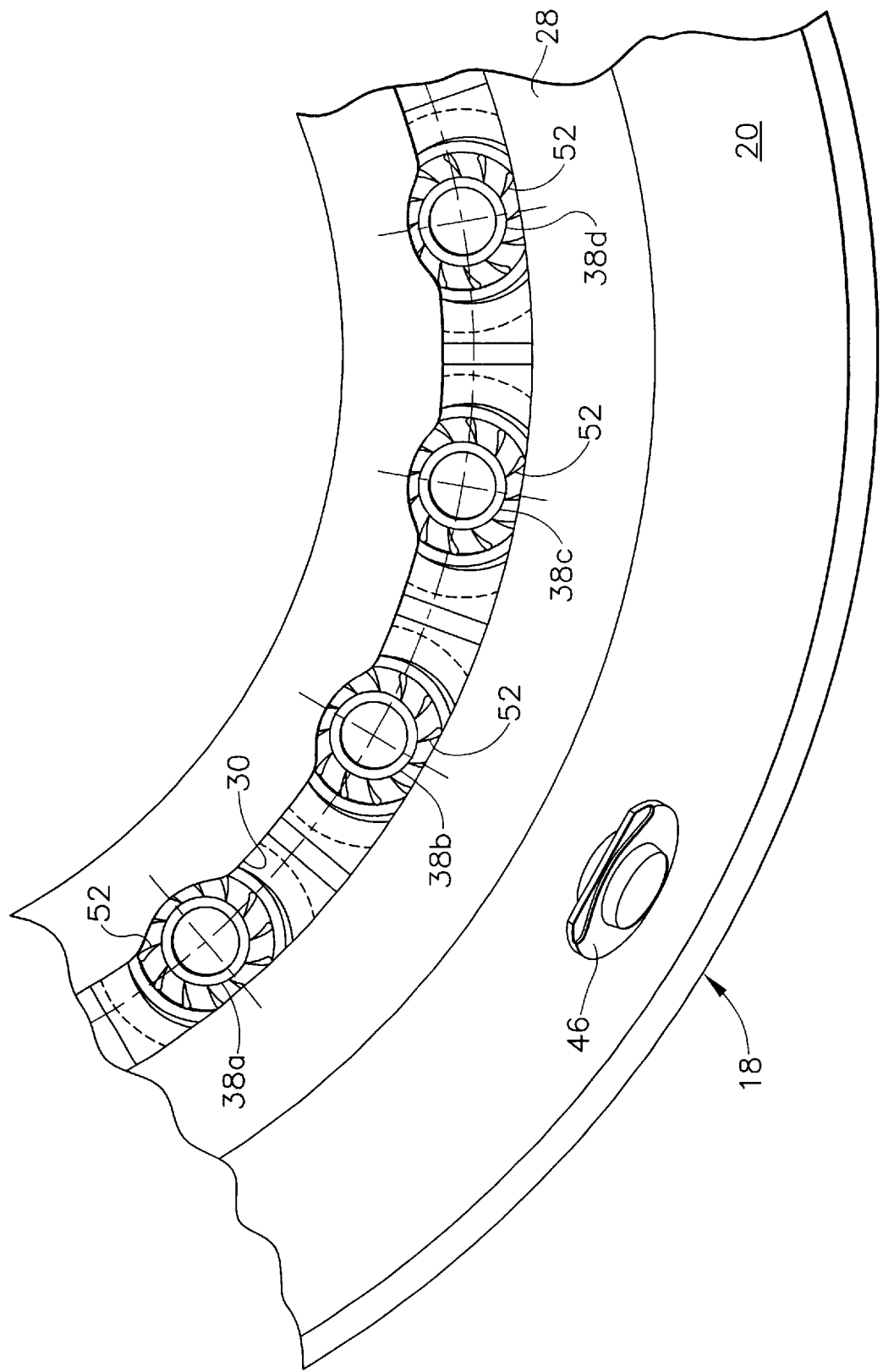
FIG. 2 is a fragmentary forward-looking-aft view of the combustor from the gas turbine engine of FIG. 1.

Turning now to FIG. 2, which is a forward-looking-aft view of a portion of the combustor 18, four adjacent ones of the swirlers 38 are seen through the annular opening 30 in the cowl assembly 28. (The fuel nozzles 40 are not shown in FIG. 2.) By way of example, the combustor 18 has a total of eighteen swirlers (and thus eighteen fuel nozzles), although the present invention is applicable to combustors having any number of swirlers and fuel mixers. For purposes of the following discussion, the four swirlers shown in FIG. 2 are individually identified as the first, second, third and fourth swirlers 38a, 38b, 38c and 38d, respectively, wherein the second swirler 38b is circumferentially aligned with the igniter port 46 (and hence the igniter 44) in a common radial plane extending through the centerline axis 24.

The adjacent second and third swirlers 38b and 38c are both relatively low air flow swirlers, while the first and fourth swirlers 38a and 38d (as well as all of the remaining swirlers 38 not shown in FIG. 2) are higher air flow swirlers. That is, the second and third swirlers 38b and 38c are sized to deliver less air than the other swirlers for a given compressor discharge pressure. All eighteen fuel nozzles 40 are identical to one another and deliver essentially equal amounts of fuel to the corresponding fuel-air mixers 36. Thus, the two fuel-air mixers having the second and third swirlers 38b and 38c mix the same amount of fuel as the other fuel-air mixers with a smaller amount of air. This results in a local region of increased fuel-to-air ratio in the vicinity of the igniter 44 that is able to more easily re-ignite in the event that the flames of remaining fuel-air mixers are extinguished temporarily during periods of insufficient fuel-to-air ratio, such as might occur during rapid engine deceleration. Using two side-by-side low air flow swirlers 38b and 38c increases the size of the local increased fuel-to-air ratio region with respect to that obtainable with a single low air flow swirler. This adds sufficient robustness to the combustor 18 to prevent engine flameouts.

It should be noted that while FIG. 2 shows the second and third swirlers 38b and 38c as being low air flow swirlers, the present invention is not limited to this configuration. For example, the first and second swirlers 38a and 38b could alternatively be the low air flow swirlers. Furthermore, it is not necessary that one of the low air flow swirlers be precisely circumferentially aligned with the igniter, as long as all low air flow swirlers are generally aligned with the igniter. The present invention includes any configuration of at least two adjacent low air flow swirlers in general circumferential alignment with the igniter.

Figure 3:
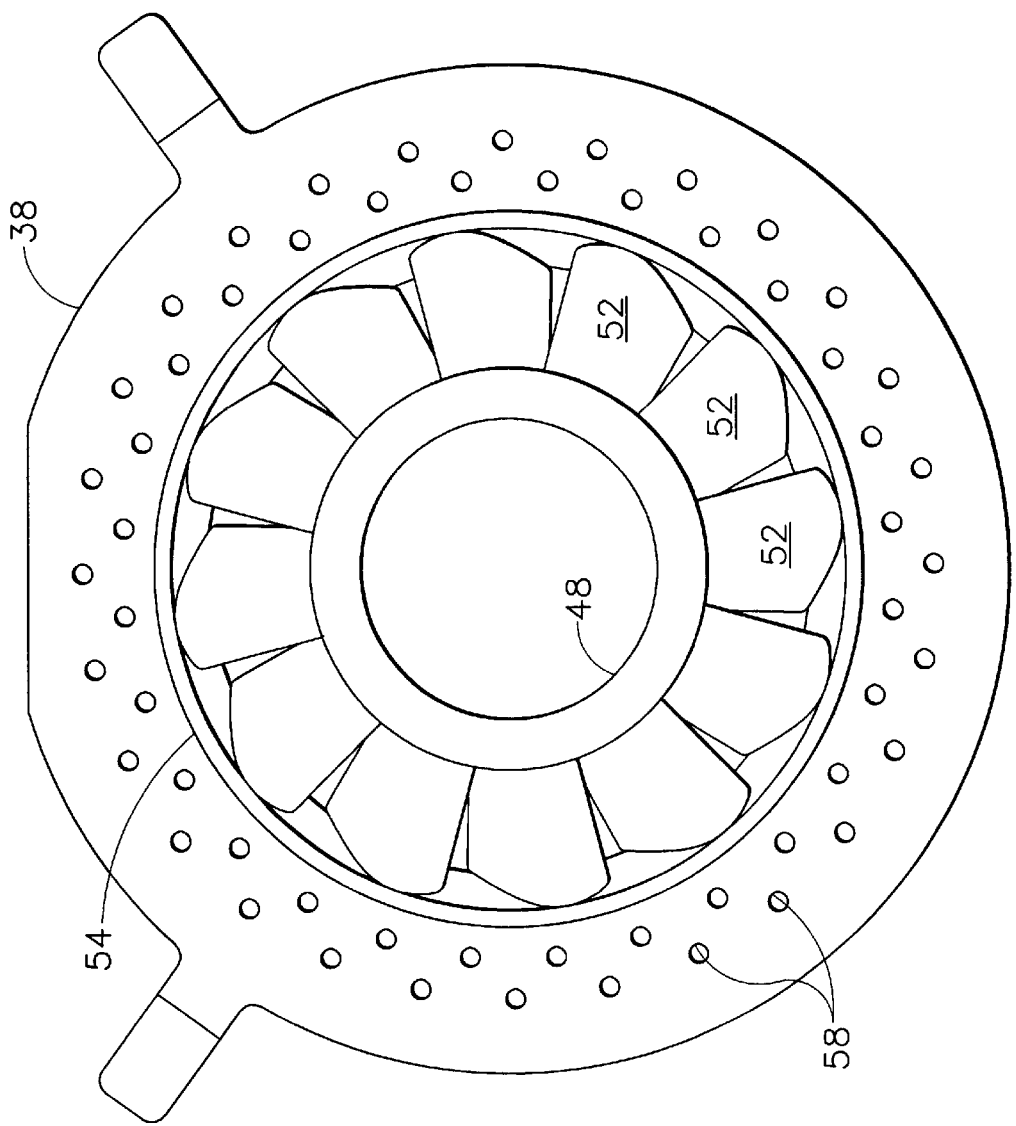
FIG. 3 is a forward-looking-aft view of one of the swirlers from the combustor of FIG. 2.
Figure 5:
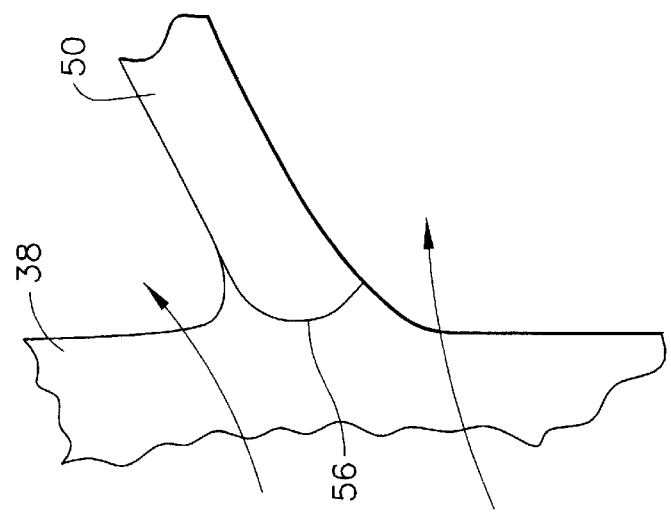
FIG. 5 is an enlarged, fragmentary view of a portion of the swirler from FIG. 4.
Figure 4:
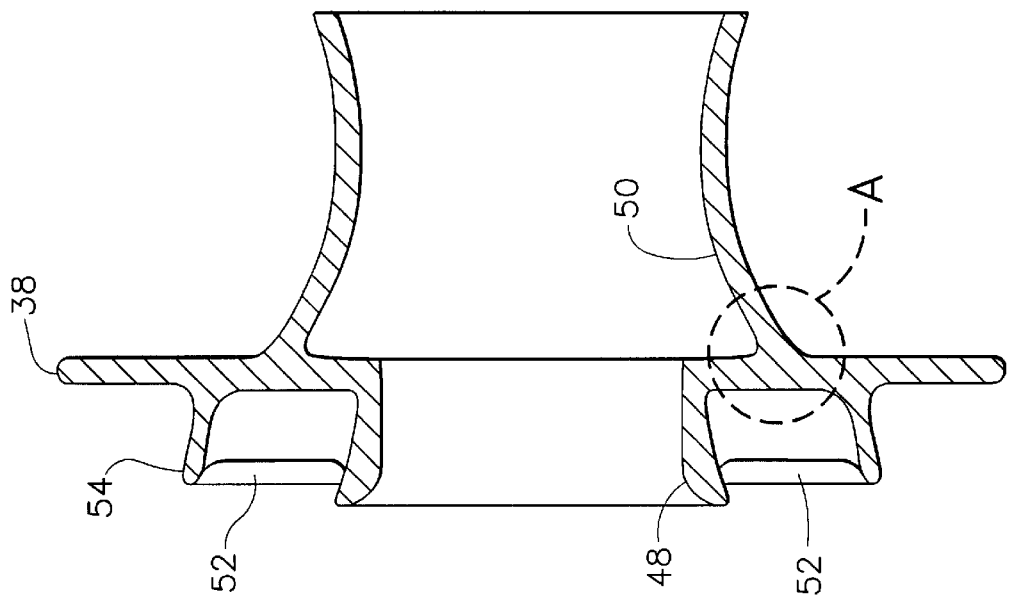
FIG. 4 is a longitudinal sectional view of the swirler of FIG. 3.

Referring to FIGS. 3 and 4, it is seen that each swirler 38 includes a ferrule 48 for receiving the corresponding fuel tip 42 and a venturi 50 located aft of, and coaxially aligned with, the ferrule 48. A plurality of circumferentially spaced vanes 52 is disposed coaxially about the ferrule 48 and enclosed by a ring 54. The vanes 52 are angled so as to impart the swirling motion to air passing through the swirler 38. As seen in FIG. 5, which is an enlargement of the area enclosed by the circle A in FIG. 4, each swirler 38 has a splitter lip 56 formed at the forward edge of the venturi 50.

The splitter lip 56 splits the incoming air flow between an inner air circuit in which air flows into the venturi 50 and mixes with fuel and an outer air circuit in which air bypasses the venturi 50 and flows directly into the combustion chamber 26. The outer air circuit is also fed by a series of anti-carbon purge holes 58 (FIG. 3) formed in the swirler base.

Thus, it is primarily first circuit air that mixes with the fuel and feeds the combustion flames. The amount of air flow through each inner circuit is determined by the size and geometry of the vanes 52, which determines the size and geometry of the gaps between the vanes 52.

Although not discernable in FIG. 2, the vanes 52 in the low air flow swirlers 38b and 38c are larger than the vanes 52 of the other swirlers. Accordingly, the gaps between the vanes 52 in the low air flow swirlers 38b and 38c are smaller that the gaps in the other swirlers, which results in the reduction in air flow. Swirler air flow reduction can be accomplished by other geometry changes as well. For instance, the ring 54 containing the vanes 52 in the low air flow swirlers 38b and 38c could be provided with a smaller diameter in order to reduce air flow therethrough.

The air flow reduction of the inner circuit of the low air flow swirlers 38b and 38c is generally up to 50% of the air flow through the inner circuit of the other swirlers. Preferably, the air flow reduction is about 30–50%. In one preferred embodiment, all of the air flow reduction is through the inner circuit and not the outer circuit.

As mentioned above, using two adjacent low air flow swirlers instead of a single low air flow swirler increases the size of the local enriched fuel-to-air ratio region and adds sufficient robustness to the combustor to prevent engine flameouts. More specifically, adding an additional low air flow swirler increases the flameout margin of the combustor 18. As used herein, the flameout margin refers to the margin with respect to the nominal Wf/Ps3 schedule, where Wf/Ps3 represents the ratio of the fuel flow (Wf) to the static pressure at the exit of the compressor (Ps3) as a percentage. Testing of the two low air flow swirler concept has demonstrated an average flameout margin of just over 15%. This represents a statistically significant improvement of approximately 9% in average flameout margin as compared to a combustor having a single low air flow swirler.

The foregoing has described a combustor for a gas turbine engine having two adjacent low air flow swirlers for preventing engine flameouts. While specific embodiments of the present invention have been described, it will be apparent to those skilled in the art that various modifications thereto can be made without departing from the spirit and scope of the invention as defined in the appended claims.

What is claimed is:

1. A combustor comprising:

outer and inner liners defining a combustion chamber;

an igniter mounted to said outer liner; and a plurality of swirlers circumferentially spaced around a forward end of said combustor, wherein at least two of said swirlers individually deliver less air to said combustion chamber than each of the remaining ones of said plurality of swirlers, said at least two swirlers being in general circumferential alignment with said igniter.

2. The combustor of claim 1 further comprising a centerline axis and wherein one of said at least two swirlers and said igniter are circumferentially aligned in a common radial plane extending through said centerline axis and another one of said at least two swirlers is located adjacent to said one of said at least two swirlers.

3. The combustor of claim 1 wherein each one of said plurality of swirlers includes an inner air circuit and an outer air circuit, and wherein said inner air circuit of each of said at least two swirlers delivers up to 50% less air than said inner air circuit of each of the remaining ones of said plurality of swirlers.

4. The combustor of claim 3 wherein said inner air circuit of each of said at least two swirlers delivers about 30–50% less air than said inner air circuit of each of the remaining ones of said plurality of swirlers.

5. The combustor of claim 1 wherein said combustor has an average flameout margin of approximately 15 percent.

6. A combustor comprising:

outer and inner liners defining a combustion chamber;

an igniter mounted to said outer liner;

a dome plate disposed between said outer and inner liners;

two low air flow swirlers mounted in said dome plate adjacent to one another, said two low air flow swirlers being in general circumferential alignment with said igniter; and a plurality of higher air flow swirlers mounted in said dome plate.

7. The combustor of claim 6 further comprising a centerline axis and wherein one of said low air flow swirlers and said igniter are circumferentially aligned in a common radial plane extending through said centerline axis.

8. The combustor of claim 6 wherein each one of said two low air flow swirlers includes an inner air circuit and an outer air circuit and each one of said plurality of higher air flow swirlers includes an inner air circuit and an outer air circuit, and wherein said inner air circuit of each one of said two low air flow swirlers delivers up to 50% less air to said combustion chamber than said inner air circuit of each one of said plurality of higher air flow swirlers.

9. The combustor of claim 8 wherein said inner air circuit of each one of said two low air flow swirlers delivers about 30–50% less air to said combustion chamber than said inner air circuit of each one of said plurality of higher air flow swirlers.

10. The combustor of claim 6 wherein said combustor has an average flameout margin of approximately 15 percent.

11. A combustor comprising:

outer and inner liners defining a combustion chamber;

an igniter mounted to said outer liner;

a dome plate disposed between said outer and inner liners, said dome plate having a plurality of circumferentially spaced openings formed therein; and a fuel-air mixer disposed in each one of said openings, each fuel-air mixer comprising a swirler mounted in a corresponding one of said openings and a fuel nozzle received in a corresponding one of said swirlers, wherein two adjacent ones of said swirlers are low air flow swirlers and are in general circumferential alignment with said igniter and the rest of said swirlers are higher air flow swirlers, and wherein each one of said fuel nozzles provides a similar amount of fuel so that said two fuel-air mixers having low air flow swirlers produce a local region of increased fuel-to-air ratio in the vicinity of said igniter.

12. The combustor of claim 11 further comprising a centerline axis and wherein one of said two fuel-air mixers having low air flow swirlers and said igniter are circumferentially aligned in a common radial plane extending through said centerline axis.

13. The combustor of claim 11 wherein each one of said two low air flow swirlers includes an inner air circuit and an outer air circuit and each one of said higher air flow swirlers includes an inner air circuit and an outer air circuit, and wherein said inner air circuit of each one of said two low air flow swirlers delivers up to 50% less air to said combustion chamber than said inner air circuit of each one of said higher air flow swirlers.

14. The combustor of claim 13 wherein said inner air circuit of each one of said two low air flow swirlers delivers about 30–50% less air to said combustion chamber than said inner air circuit of each one of said higher air flow swirlers.

15. The combustor of claim 11 wherein said combustor has an average flameout margin of approximately 15 percent.

* * * * *